(12) United States Patent
Nanaumi (10) Patent No.: US 8,191,127 B2
(45) Date of Patent: May 29, 2012

(54) INFORMATION PROCESSING APPARATUS AND METHOD

(75) Inventor: Yoshihito Nanaumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 12/918,998

(22) PCT Filed: Jul. 1, 2010

(86) PCT No.: PCT/JP2010/061574
§ 371 (c)(1),
(2), (4) Date: Aug. 23, 2010

(87) PCT Pub. No.: WO2011/016310
PCT Pub. Date: Feb. 10, 2011

(65) Prior Publication Data
US 2011/0173688 A1  Jul. 14, 2011

(30) Foreign Application Priority Data

Aug. 4, 2009 (JP) .................................. 2009-181969

(51) Int. Cl.
*G06F 17/30* (2006.01)
(52) U.S. Cl. .............................. 726/8; 713/182; 713/185
(58) Field of Classification Search ...... 726/8; 713/182, 713/185
See application file for complete search history.

(56) References Cited

U.S. PATENT DOCUMENTS

| 2002/0059463 A1* | 5/2002 | Goldstein ..................... 709/247 |
| 2004/0128542 A1 | 7/2004 | Blakley, III et al. |
| 2006/0021018 A1 | 1/2006 | Hinton et al. |
| 2007/0180508 A1* | 8/2007 | Thomson ......................... 726/8 |
| 2007/0220268 A1* | 9/2007 | Krishnaprasad et al. ..... 713/182 |
| 2007/0234417 A1 | 10/2007 | Blakley, III et al. |

FOREIGN PATENT DOCUMENTS

| JP | 2004110364 A | 4/2004 |
| JP | 2006031714 A | 2/2006 |
| JP | 2006515447 A | 5/2006 |
| JP | 2008071226 A | 3/2008 |
| WO | 2004059415 A2 | 7/2004 |

OTHER PUBLICATIONS

PCT International Search Report in corresponding International Application No. PCT/JP2010/061574, dated Sep. 7, 2010.
Written Opinion of the International Searching Authority in corresponding International Application No. PCT/JP/2010/061574, dated Sep. 7, 2010.

* cited by examiner

*Primary Examiner* — Nabil El Hady
(74) *Attorney, Agent, or Firm* — Fitzpatrick, Cella, Harper & Scinto (57) ABSTRACT

When authentication processing has succeeded between different authentication domains in an information processing apparatus, authentication information between the different authentication domains is registered in association with user-related information. When a data conversion is performed between the different authentication domains, the data conversion of the user-related information is carried out based upon the registered authentication information.

6 Claims, 13 Drawing Sheets

| DATA NAME | DATA TYPE |
|---|---|
| USER NAME | varchar(256) |
| PASSWORD | binary |

FIG. 4B

| DATA NAME | DATA TYPE |
|---|---|
| USER NAME | varchar(256) |
| EXTERNAL ACCESS KEY | binary |
| DIFFERENT AUTHENTICATION DOMAIN NAME | varchar(256) |
| PASSWORD | binary |

| USER NAME | PASSWORD |
|---|---|
| USER A | AAA |
| USER B | BBB |
| USER C | CCC |

602

| USER NAME | PASSWORD |
|---|---|
| USER X | XXX |
| USER Y | YYY |
| USER Z | ZZZ |

603

| USER NAME | EXTERNAL ACCESS KEY | DIFFERENT AUTHENTICATION DOMAIN NAME | PASSWORD |
|---|---|---|---|
| USER A | DOCUMENT MANAGEMENT SERVER | USER X | XXX |
| USER B | DOCUMENT MANAGEMENT SERVER | USER Y | YYY |
| USER C | DOCUMENT MANAGEMENT SERVER | USER Z | ZZZ |

| USER NAME | PASSWORD |
|---|---|
| USER L | LLL |
| USER M | MMM |
| USER N | NNN |

605

| USER NAME | EXTERNAL ACCESS KEY | DIFFERENT AUTHENTICATION DOMAIN NAME | PASSWORD |
|---|---|---|---|
| USER A | DOCUMENT MANAGEMENT SERVER | USER X | XXX |
| USER B | DOCUMENT MANAGEMENT SERVER | USER Y | YYY |
| USER C | DOCUMENT MANAGEMENT SERVER | USER Z | ZZZ |
| USER A | PRINT MANAGEMENT SERVER | USER L | LLL |
| USER B | PRINT MANAGEMENT SERVER | USER M | MMM |
| USER C | PRINT MANAGEMENT SERVER | USER N | NNN |

INFORMATION PROCESSING APPARATUS AND METHOD

TECHNICAL FIELD

The present invention relates to an information processing apparatus and method.

BACKGROUND ART

In order to deal with the shortening of the business cycle and sudden changes in the business environment in recent years, computer systems capable of accommodating such changes flexibly and rapidly are sought. In order to meet such demand, a system architecture referred to as (SOA) Service-Oriented Architecture has been proposed.

With SOA, the functions of an existing system are made public as software components and are made to cooperate with one another to thereby construct an overall system by "combination". Communication among the software components is implemented by a Web service accessible by SOAP, by way of example.

Furthermore, in a case where the functions of existing systems having difference authentication domains are utilized and an overall system is implemented by "combination", authentication becomes necessary whenever a function is utilized. Accordingly, a method referred to as SSO (Single Sign-On) in which functions across domains become utilizable merely by the user being authenticated a single time has been considered. A method of managing credentials between different authentication domains by a key chain is available as a conventional technique for implementing SSO (for example, see Japanese Patent Laid-Open No. 2008-071226). Further, there is a method using so-called "federation" in which different authentication mechanisms establish a relationship of trust to thereby enable an exchange of data by using the same credentials. There is also a method based upon operation using the same user name and password by synchronization between different authentication mechanisms (for example, see Japanese Patent Laid-Open No. 2004-110364).

Although the prior art described above makes it possible to readily acquire data and to set data between different authentication domains by SSO-based authentication, it is difficult to maintain continuity at the content level of the data. In order to link systems across different authentication domains, however, it is desired that continuity be maintained at the content level.

SUMMARY OF INVENTION

The present invention provides an apparatus and method for making an appropriate linked service possible by maintaining continuity at the content level between systems of different authentication domains.

According to one aspect of the present invention, there is provided an information processing apparatus comprising: registration means, in a case where authentication processing has succeeded between different authentication domains, for registering authentication information between the different authentication domains in association with user-related information; and conversion means, when a data conversion is performed between the different authentication domains, for performing a data conversion of the user-related information based upon the authentication information registered by the registration means.

According to another aspect of the present invention, there is provided a method of processing executed by an information processing apparatus, comprising: a registration step, in a case where authentication processing has succeeded between different authentication domains, of registering authentication information between the different authentication domains in association with user-related information; and a conversion step, when a data conversion is performed between the different authentication domains, of performing a data conversion of the user-related information based upon the authentication information registered at the registration step.

Further features of the present invention will become apparent from the following description of exemplary embodiments with reference to the attached drawings.

DESCRIPTION OF EMBODIMENTS

Embodiments for practicing the present invention will now be described in detail with reference to the drawings. A function integrating server of a computer system in which a plurality different authentication domains have been connected via a network will be described as an example of an information processing apparatus in this embodiment.

First Embodiment

Figure 1:
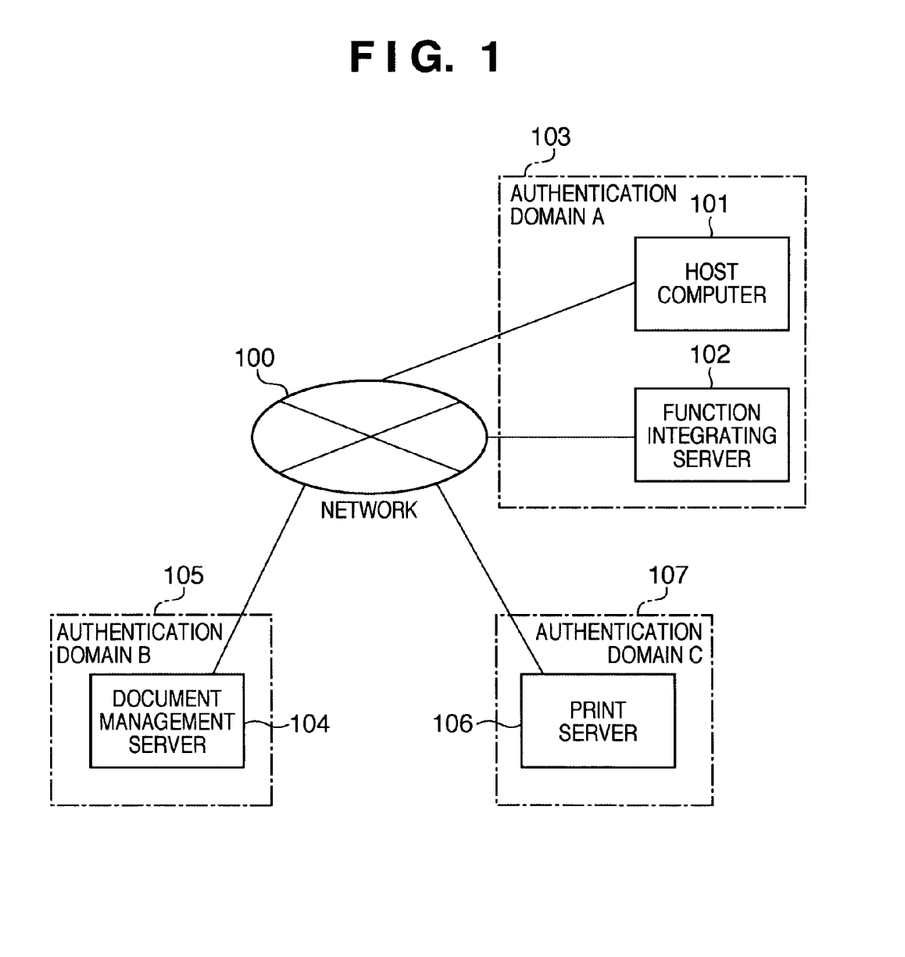
FIG. 1 is a diagram illustrating an example of the configuration of a computer system.

First, an example of the configuration of a computer system will be described with reference to FIG. 1. In a first embodiment, it will be assumed that an authentication domain C 107 has not been connected. That is, the computer system in the first embodiment is constituted by an authentication domain A 103 and an authentication domain B 105. A host computer 101 and a function integrating server 102 belong to the authentication domain A 103, and a document management server 104 belongs to the authentication domain B 105. The authentication domains A 103 and B 105 perform user management and authentication independently. A network 100 is a LAN and may be connected to a WAN or to the Internet.

The host computer 101 of the authentication domain A 103 has a browser and can provide service upon establishing an HTTP connection with the function integrating server 102 via the network 100. The host computer 101 is a personal computer, a PDA (Personal Digital Assistant) or a mobile telephone, etc. The function integrating server 102 operates using a group of software processes for the purpose of implementing an application server. The function integrating server 102 utilizes the document management function of the document management server 104 and provides integrated service. The connection between the function integrating server 102 and document management server 104 is implemented by a SOAP-accessible Web service.

It should be noted that the present invention is applicable as a single device or as a system comprising a plurality of devices so long as the functions of the present invention are executed. Further, the invention is applicable even in a system in which the host computer 101 is connected to the function integrating server 102 via a dedicated client application and receives the provision of a service. Furthermore, the service provided by the function integrating server 102 is not limited to the document management function of the document management server 104. The invention is applicable even in an arrangement in which the host computer 101 does not belong to the authentication domain A 103.

The hardware configuration of the host computer 101, function integrating server 102, document management server 104 and print server 106 constituting the computer system will be described with reference to FIG. 2. The hardware configuration shown in FIG. 2 corresponds to the hardware configuration of an ordinary information processing apparatus. The hardware configuration of an ordinary information processing apparatus can be applied to the host computer 101, function integrating server 102, document management server 104 and print server 106.

Figure 2:
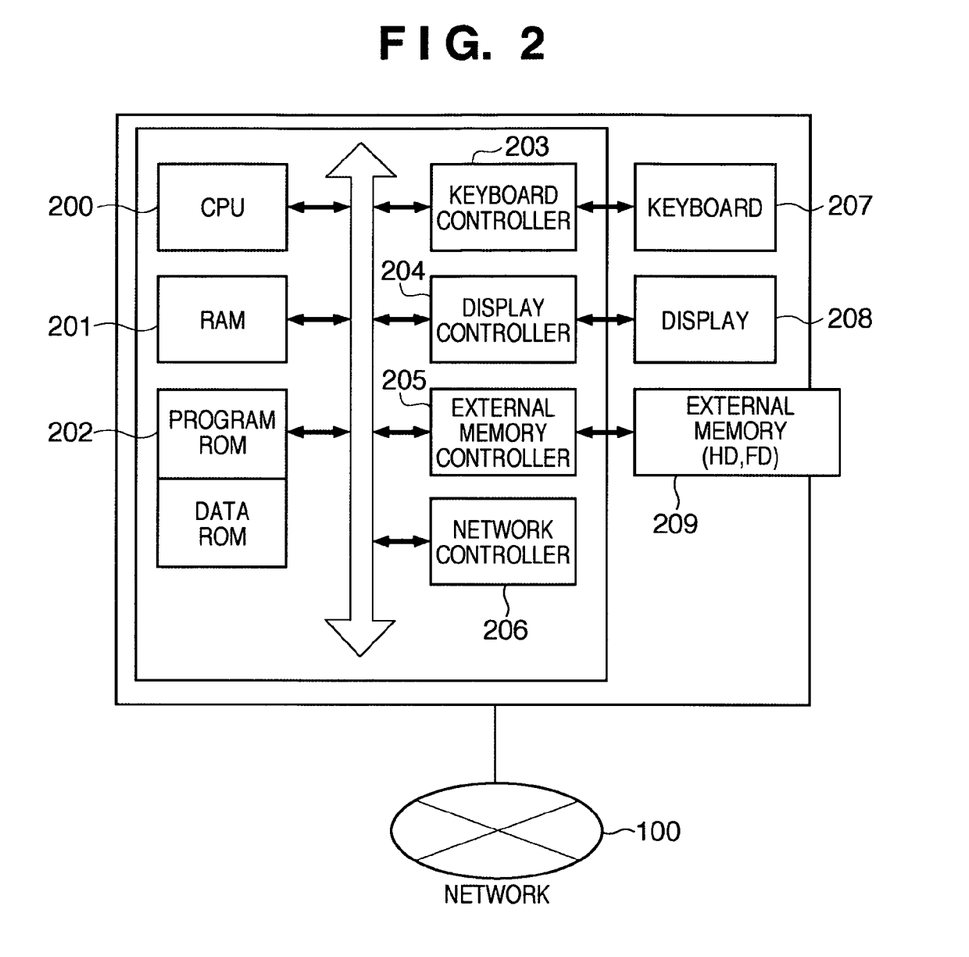
FIG. 2 is a diagram illustrating the hardware configuration of an apparatus constituting the computer system.

In FIG. 2, a CPU 200 executes programs such as an OS and applications that have been stored in the program ROM of a ROM 202 or loaded into a RAM 201 from an external memory 209. Here, the "OS" is an abbreviation for an operating system. The processing indicated in flowcharts below is executed by the CPU 200. The RAM 201 functions as the main memory and work area, etc., of the CPU 200. A keyboard controller 203 controls inputs from a keyboard 207 and from a pointing device, not shown. A display controller 204 controls the display presented on various displays 208. An external memory controller 205 controls data access to a hard disk (HD) storing various data and to an external memory 209 such as a flexible disk (FD). A network controller 206 is connected to a network 100 and executes processing for controlling communication with other devices connected to the network.

Figure 3:
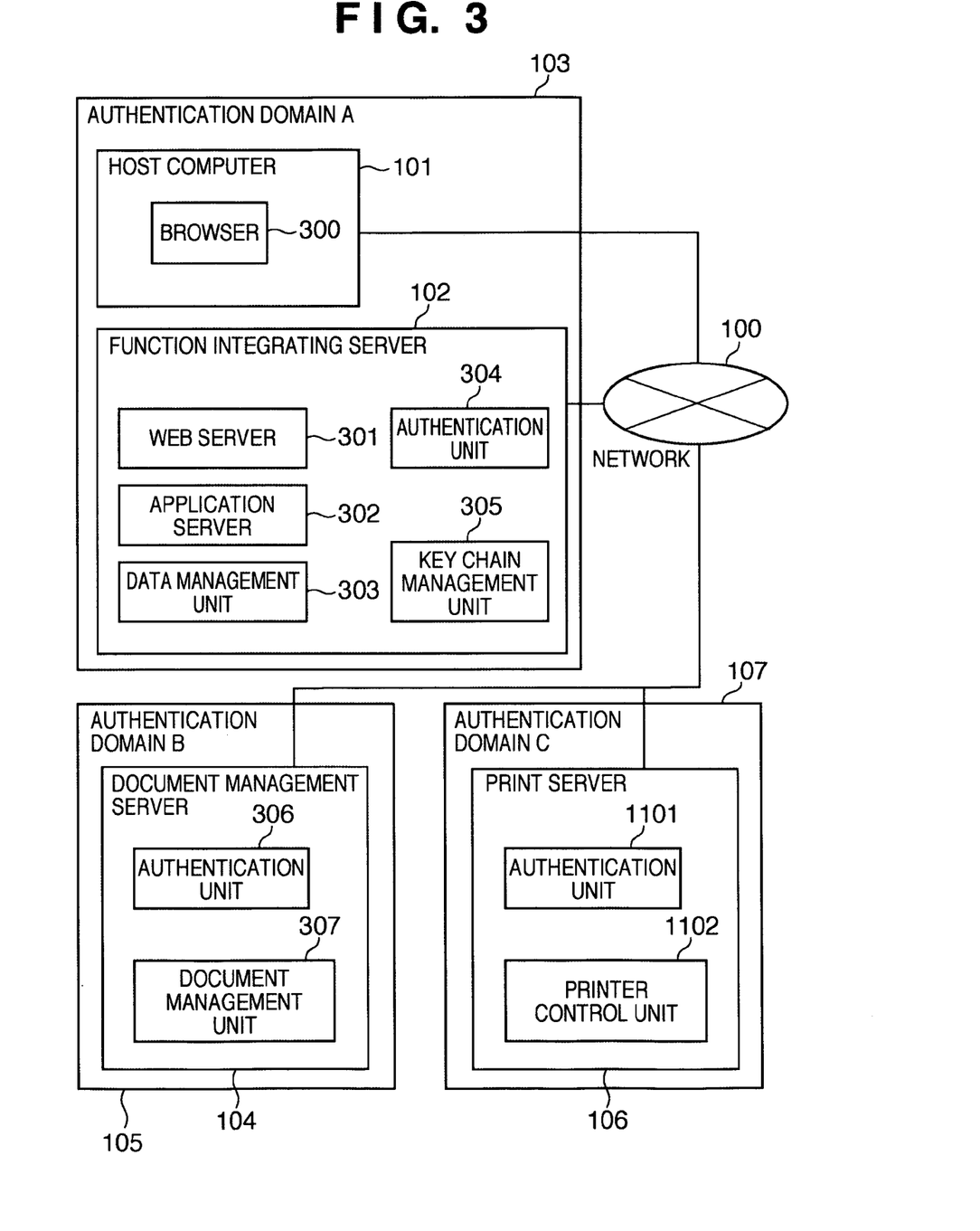
FIG. 3 is a diagram illustrating the software configuration of the computer system.

Next, the software configuration of the host computer 101, function integrating server 102, document management server 104 and print server 106 (the details of which will be set forth later) will be described with reference to FIG. 3. The host computer 101 includes a browser 300 that exists as a program file stored in the external memory 209. In a case where the browser 300 is executed, the browser 300 is loaded into the RAM 201 and is executed by the CPU 200. The browser 300 loaded into the RAM 201 and executed is displayed on the display 208 and receives user input from the keyboard 207 or from a pointing device, not shown. Furthermore, the browser 300 receives provision of service upon establishing an HTTP connection with the function integrating server 102 via the network 100.

The function integrating server 102 includes a Web server 301, an application server 302, a data management unit 303, an authentication unit 304 and a key chain management unit 305. These exist as program files stored in the external memory 209 of the function integrating server 102. In a case where these are executed, they are loaded into the RAM 201 by the operating system or by a module that utilizes these modules, and they are executed by the CPU 200.

The Web server 301 accepts an HTTP request from the browser 300 of the host computer 101 via the network 100 and sends the HTTP response conforming to this request back to the host computer 101. The application server 302 is called from the Web server 301 in response to the HTTP request and executes processing.

The application server 302 sends back to the Web server 301 HTML generated dynamically as the result of processing. The application server 302 further performs a Web-service call from a service requester (not shown) to an external service (the document management server 104, etc.) via the network 100.

The data management unit 303 performs management of data requiring permanency. The authentication unit 304 executes authentication processing. A detailed description of the authentication unit 304 will be given later. The key chain management unit 305 manages credentials when services of different authentication domains are utilized. The details of the key chain management unit 305 will be given later. The term "credentials" refers to credibility information utilized in authentication. Although user name and password generally are used, biometrics (biological information), a smart code or a public-key certificate may also be utilized. In a case where the term "credentials" (authentication information) is employed below, it will be taken to indicate user-related information (user name and password).

The document management server 104 includes an authentication unit 306 and a document management unit 307. These exist as program files stored in the external memory 209 of the document management server 104. In a case where these are executed, they are loaded into the RAM 201 and are executed by the CPU 200. The document management unit 307 provides a document management function. The document management unit 307 has a Web service interface and provides an external unit with a document management function. The authentication unit 306 executes authentication processing. A detailed description of the authentication unit 306 will be given later.

The authentication unit 304 of the function integrating server 102 and the authentication unit 306 of the document management server 104 execute credentials-based user authentication processing, user management, user settings management and user authorization management. The authentication units 304 and 306 generate a security token when authentication succeeds. A security token is a symbol indicating that authentication has been completed and is issued in a case where credentials have been confirmed as being valid and authentication has succeeded. It is an identifier certifying that authentication has succeeded.

It should be noted that any authentication scheme may be used so long as the functions of the present invention are implemented. For example, NTLM authentication or Kerberos authentication may be used as the authentication scheme. Furthermore, the authentication units 304 and 306 may be adapted to exchange information with an external authentication server, not shown.

Figure 4A:
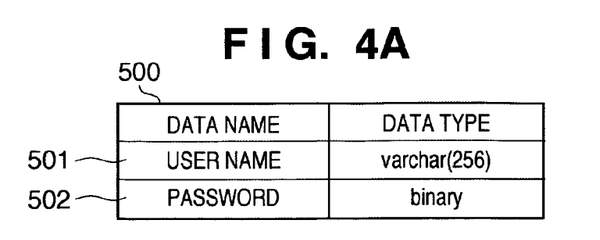
FIG. 4A is a diagram illustrating data managed by an authentication unit.

FIG. 4A illustrates an example of the structure of data managed by the authentication units 304 and 306. A table 500 indicates the structure of data managed by the authentication units 304 and 306 and is composed of data names and data types. User name 501 is a section for a storing user name, and password 502 is a section for storing password information.

The key chain management unit 305 of the function integrating server 102 caches credentials for logging into a different authentication domain. The cached data is encrypted and stored by the data management unit 303. The registration of credentials in the key chain management unit 305 and the acquisition thereof are performed using the security token as the key. The credentials of another user, therefore, cannot be acquired.

Figure 4B:
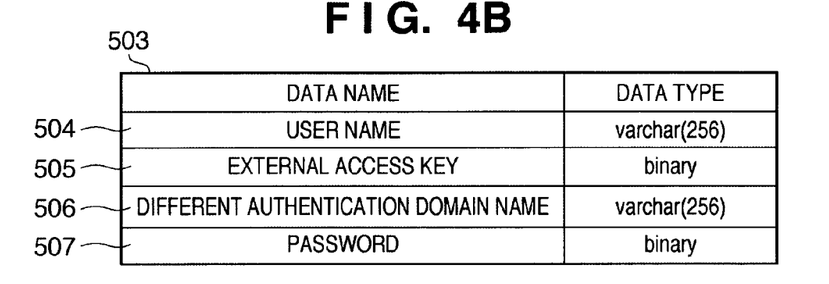
FIG. 4B is a diagram illustrating data managed by a key chain management unit.

FIG. 4B illustrates an example of the structure of data managed by the key chain management unit 305. A table 503 indicates the structure of the data managed by the key chain management unit 305 and is composed of data names and data types. User name 504 is a section for storing a user name, external access key 505 is a section for storing key information for identifying an authentication domain, different authentication domain user name 506 is a section for storing the user name of a different authentication domain, and password 507 is a section for storing the password information of the different authentication domain.

The key chain management unit 305 provides a credentials registration function, a credentials acquisition function and a key chain reverse-lookup function. The credentials registration function is a function for registering user name 504, external access key 505, different authentication domain user name 506 and password 507 using the security token and user name 504 as keys. The credentials acquisition function is a function for acquiring different authentication domain user name 506 and password 507 by using the security token, user name 504 and external access key 505. The key chain reverse-lookup function is a function for retrieving different authentication domain user name 506 from the security token and external access key 505 and acquiring user name 504.

Figure 5A:
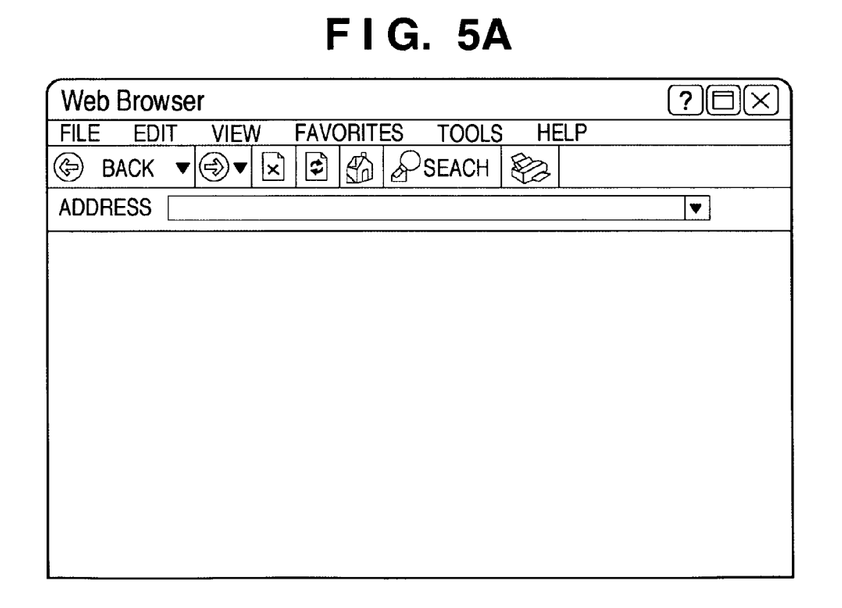
FIG. 5A is a diagram illustrating an example of a user interface.

FIG. 5A illustrates an example of the user interface of the browser 300. The user interface of the browser 300 corresponds to that of an ordinary browser and is also applicable in this embodiment. With regard to the user interface of the browser 300, there is no limitation upon the form of the interface, the arrangement of the areas and the controls. The interface may have any form so long as the required functions can be implemented.

Figure 6A:
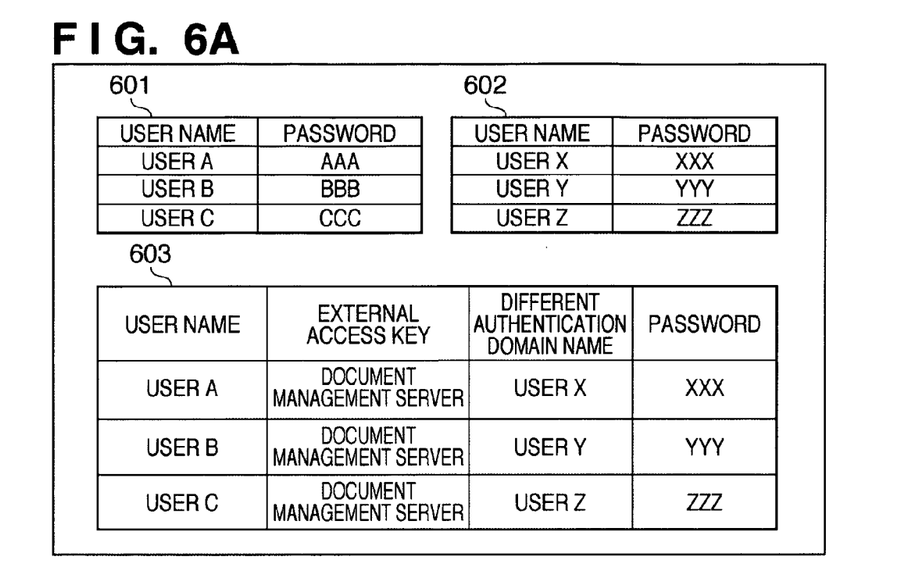
FIG. 6A is a diagram illustrating data managed by an authentication unit and key chain management unit according to a first embodiment of the present invention.

First processing for displaying document properties will be described with reference to FIGS. 6A, 6B, FIG. 7 and FIG. 8. Data 601 shown in FIG. 6A is data managed by the authentication unit 304 of the function integrating server 102. In this example, "AAA", "BBB" and "CCC" have been registered in the function integrating server 102 as the passwords of user A, user B and user C, respectively. Further, data 602 is data managed by the authentication unit 306 of document management server 104. In this example, "XXX", "YYY" and "ZZZ" have been registered in the document management server 104 as the passwords of user X, user Y and user Z, respectively.

Furthermore, data 603 is data managed by the key chain management unit 305. In this example, the credentials of the document management server 104 have been registered using "user A" of the user name as the key. In other words, "user A" of authentication domain A 103 and "user X" of authentication domain B 105 have been associated by the key chain management unit 305 of function integrating server 102. Further, the credentials of the document management server 104 have been registered using "user B" of the user name as the key. In other words, "user B" of authentication domain A 103 and "user Y" of authentication domain B 105 have been associated by the key chain management unit 305 of function integrating server 102. Further, the credentials of the document management server 104 have been registered using "user C" of the user name as the key. In other words, "user C" of authentication domain A 103 and "user Z" of authentication domain B 105 have been associated by the key chain management unit 305 of function integrating server 102.

Figure 5B:
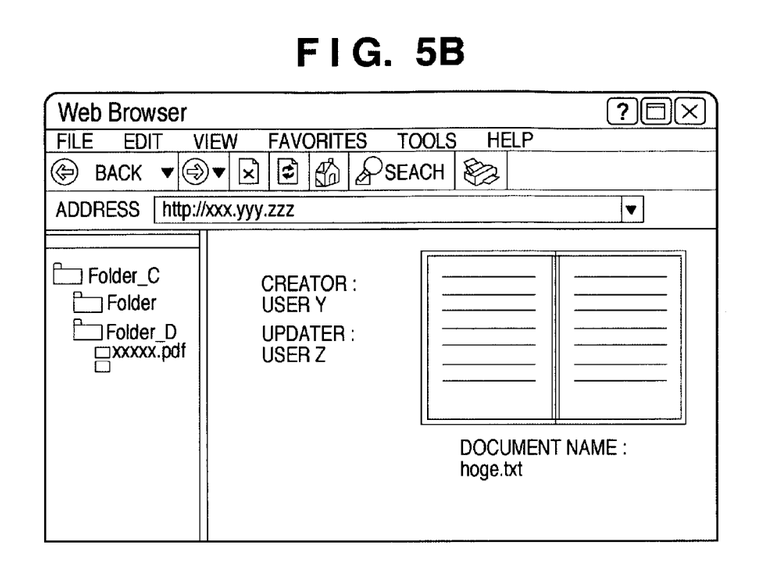
FIG. 5B is a diagram illustrating an example of document properties of a document being managed by a document management unit of a document management server.

FIG. 5B illustrates an example of document properties of a document being managed by the document management unit 307 of document management server 104. In this example, the document name is "hoge.txt", the creator of the document is "user Y", and the updater of the document is "user Z".

Figure 7:
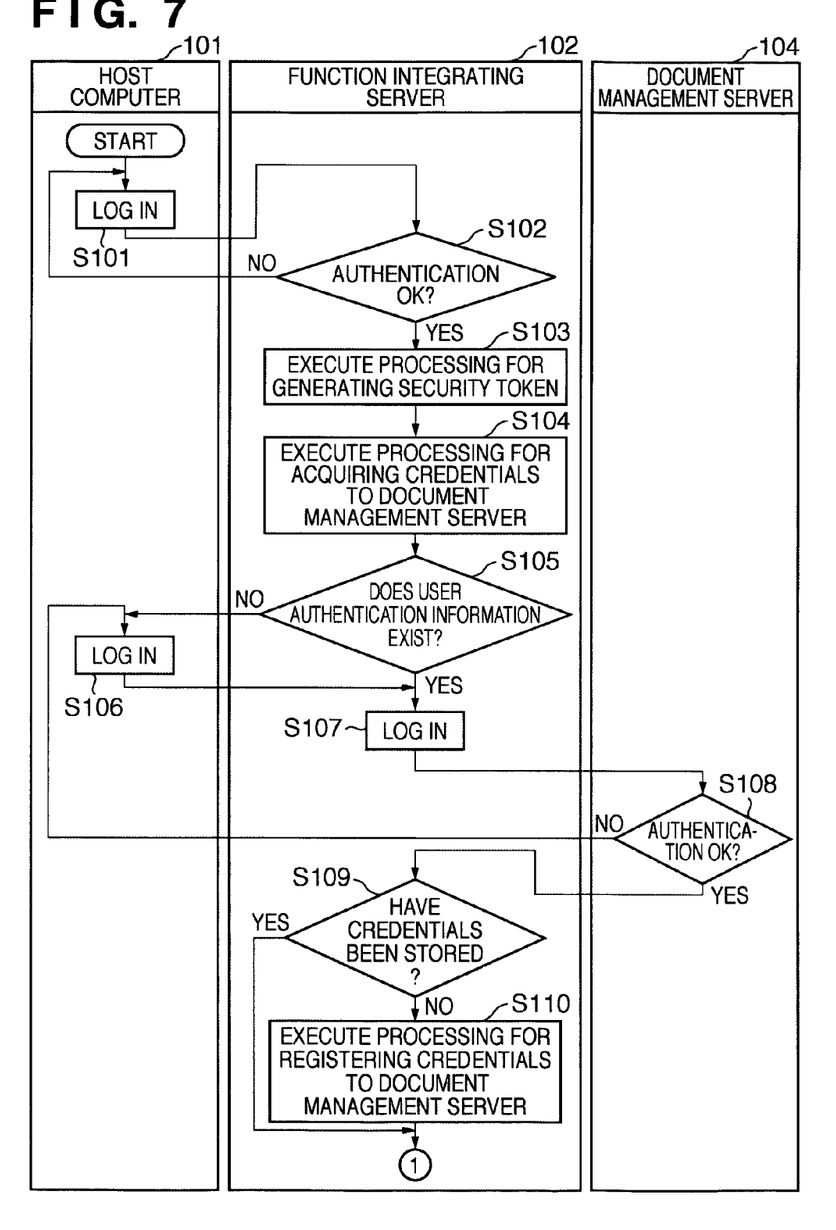
FIG. 7 is a flowchart illustrating document property display processing.

In step S101 in FIG. 7, the browser 300 of host computer 101 is launched by a command from the user and a login operation is performed by the user. Next, the browser 300 issues the function integrating server 102 a request, which is for logging into the function integrating server 102, as an HTTP request. It should be noted that the description rendered here assumes that login has been performed by "user A" of authentication domain A 103.

In step S102, the login request from the browser 300 is received by the Web server 301 of function integrating server 102, whereupon the application server 302 uses the authentication unit 304 to execute authentication processing based upon the credentials of the login request. Control proceeds to step S103 if authentication succeeds and returns to step S101 if authentication fails.

If the above-mentioned authentication succeeds, the application server 302 generates a security token using the authentication unit 304 in step S103. In step S104, the application server 302 acquires the credentials with respect to the document management server 104 from the key chain management unit 305. If the credentials can be acquired ("YES" at step S105), control proceeds to step S107. If the credentials cannot be acquired, then the application server 302 creates a screen for logging into the document management server 104 and the Web server 301 sends back a login screen as an HTTP response. Control then proceeds to step S106.

In step S106, in response to the HTTP response from the function integrating server 102, the browser 300 displays the screen for logging into the document management server 104. If the user performs the login operation, the browser 300 issues the function integrating server 102 a request to log into the document management server 104.

Next, in step S107, the application server 302 issues a login request to the document management server 104 using the credentials of the login request from the host computer 101 or the credentials acquired from the key chain management unit 305.

In step S108, the document management server 104 receives the login request from the function integrating server 102, whereupon the authentication unit 306 executes authentication processing based upon the credentials of the login request. Control proceeds to step S109 if authentication succeeds and returns to step S106 if authentication fails.

If authentication succeeds, then, in step S109, the document management unit 307 generates a security token using the authentication unit 306 and sends the security code back to the function integrating server 102 as the response to the login request of step S107. If it is found in step S109 that the credentials to the document management server 104 have been registered in the key chain management unit 305, then control proceeds to step S200 shown in FIG. 8.

Figure 8:
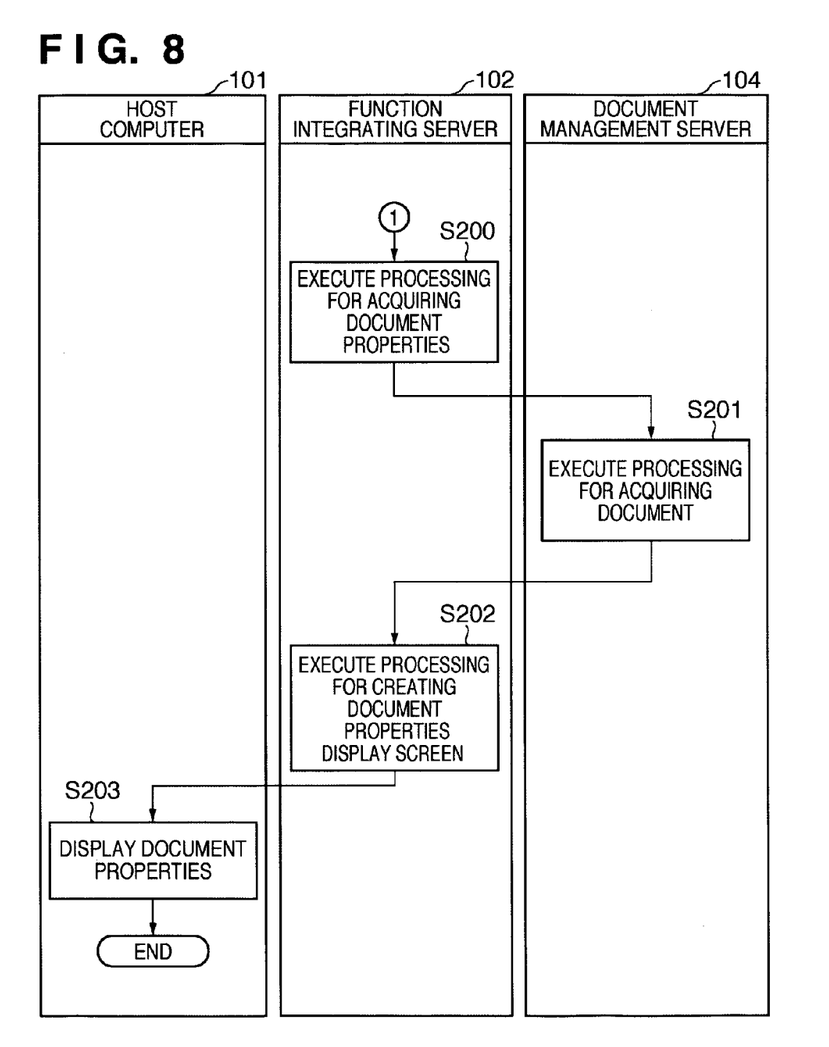
FIG. 8 is a flowchart illustrating document property display processing.

In step S110, the key chain management unit 305 executes credentials registration processing and control proceeds to step S200. In step S200, the application server 302 of function integrating server 102 issues the document management server 104 a request for acquisition of document properties.

By adopting an HTTP request in which the security token acquired in step S109 is included in the HTTP header, utilization of functions is possible without execution of authentication processing. In the description that follows, it will be assumed that the HTTP request includes the security token.

In step S201, the document management unit 307 of document management server 104 responds to the document-properties acquisition request from the function integrating server 102 by acquiring the properties information of the designated document from a database it is managing and sending this information back to the function integrating server 102. In step S202, the application server 302 of the function integrating server 102 creates a display screen based upon the received document properties information and sends the document properties screen back to the host computer 101.

In step S203, the browser 300 of host computer 101 displays the document properties screen received from the function integrating server 102, as illustrated in FIG. 5B.

If processing is thus executed, authentication can be performed and data acquired seamlessly between different authentication domains. However, the document properties information displayed on the browser 300 of host computer 101 represents the document properties possessed by the document management server 104. In this example, the document name is "hoge.txt", the creator is "user Y" and the updater is "user Z". If limited to the creator and updater, the user names are user names possessed by the document management server 104, that is, user names in the authentication domain B 105. A user logs into the function integrating server 102 as "user A" of authentication domain A 103. Next, a user logs into the document management server 104 as "user X" in the authentication domain B 105 only in a case where login to the document management server 104 has occurred for the first time.

From this point onward, the link between "user A" of the authentication domain A 103 and the "user X" of the authentication domain B 105 is managed by the function integrating server 102 and the users can access the document management server 104 without being aware of the authentication domain B 105.

In accordance with this processing for displaying document properties, a user logs in from the browser 300 of host computer 101 as a user in the authentication domain A 103. However, with regard to the display of document properties presented on the browser 300, the user names (creator: "user Y", updater: "user Z") of authentication domain B 105 are displayed, as illustrated in FIG. 5B.

In a case where data is exchanged between different authentication domains, data concerning user-related information relating to authentication domain, such as the user name, is required to undergo a suitable data conversion.

Figure 9:
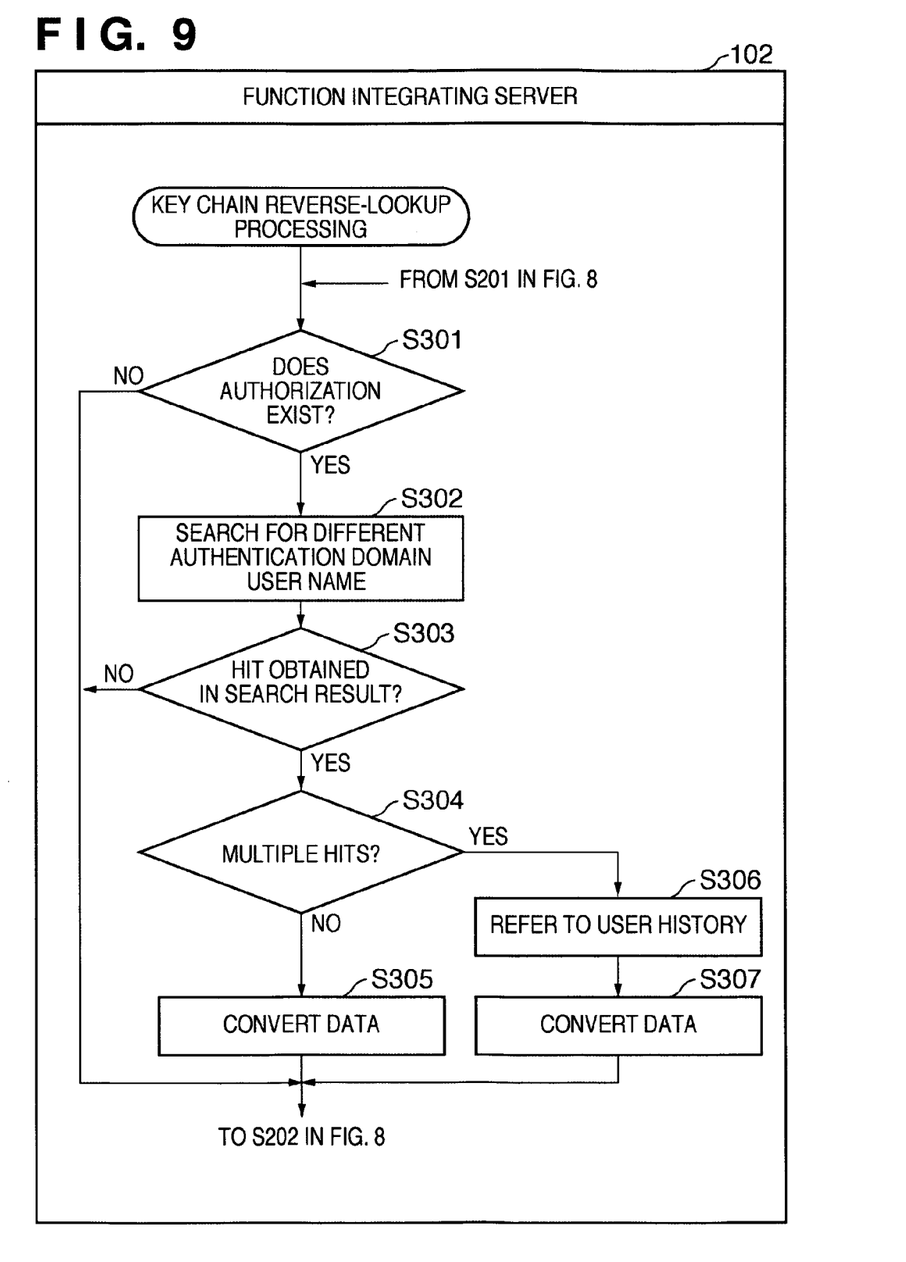
FIG. 9 is a flowchart illustrating key chain reverse-lookup processing.

Key chain reverse-lookup processing in the function integrating server 102 will be described as a data conversion with reference to FIG. 9. This processing is executed after the processing of step S201 in FIG. 8, namely after the properties information of the designated document is acquired from the database, which is being managed by the document management unit 307 of document management server 104, and sent back to the function integrating server 102.

In step S301, the application server 302 queries the authentication unit 304 as to whether key chain reverse-lookup of the user is possible from the security token. The authentication unit 304 checks the reverse-lookup authorization based upon the security token and sends back an indication as to whether key chain reverse-lookup is possible. If the key chain reverse-lookup authorization is found to exist, control proceeds to step S302. Otherwise, processing is terminated.

In step S302, by using the key chain management unit 305, the application server 302 searches for the different authentication domain user name 506 from the security token and external access key 505. Next, processing is terminated if it is found in step S303 that no hit is obtained as a result of the search. If a hit is obtained, on the other hand, then control proceeds to step S304.

If it is found in step S304 that there are multiple hits, control proceeds to step S306. Otherwise, control proceeds to step S305 and the application server 302 executes data conversion processing. Specifically, here key chain reverse-lookup is performed with respect to the document name "hoge.txt", creator "user Y" and updater "user Z", and the following data conversion is made: "user Y"→"user B", "user Z"→"user C".

In step S306, on the other hand, the application server 302 refers to the registration history of the key chain management unit 305. Then, in step S307, from the user history verified in step S306, the data conversion is performed using the information that was registered in the key chain management unit 305 last.

Thus, as described above, authentication can be performed and data acquired seamlessly between different authentication domains. Furthermore, by performing a conversion suitably under appropriate authorization management, security can be maintained and document properties displayed.

Figure 5C:
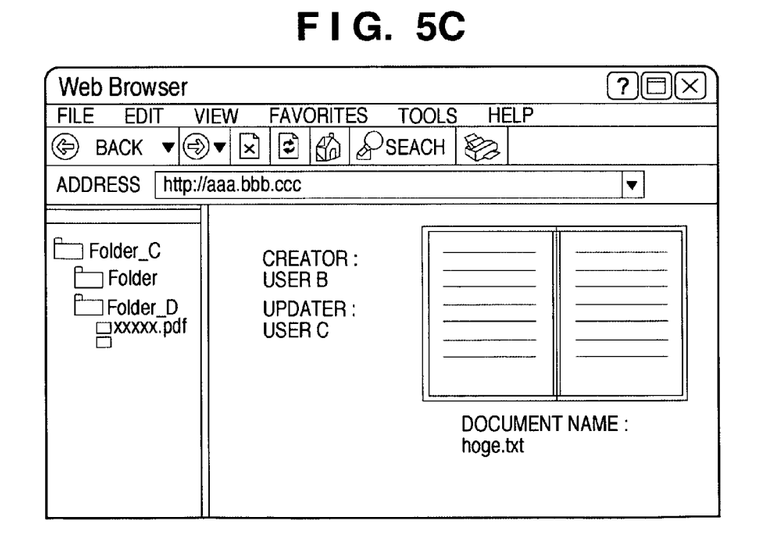
FIG. 5C is a diagram illustrating an example of document properties in which user names between different authentication domains have been converted.

More specifically, by suitably converting user names between different authentication domains, the browser 300 of host computer 101 is capable of displaying a document property screen, as shown in FIG. 5C.

Second Embodiment

Next, a second embodiment of the present invention will be described in detail with reference to the drawings. In the second embodiment, it will be assumed that the authentication domain C 107 shown in FIG. 1 of the first embodiment has been connected to the network 100. In other words, in the second embodiment, the computer system is composed of the authentication domain A 103, authentication domain B 105 and authentication domain C 107. It is assumed that the print server 106 belongs to the authentication domain C 107.

Here the print server 106 manages document printing. The function integrating server 102 utilizes the document management function of the document management server 104 and the printing function of the print server 106 and provides an integrated service that is a combination of the document management and printing functions. In a manner similar to the first embodiment, the connection among the function integrating server 102, document management server 104 and print server 106 is implemented by a SOAP-accessible Web service, by way of example. The function integrating server 102, document management server 104 and print server 106 belong to separate authentication domains, namely the authentication domain A 103, authentication domain B 105 and authentication domain C 107, and execute user management and authentication independently.

The software configuration of the print server 106 will be described with reference to FIG. 3. The print server 106 comprises units such as an authentication unit 1101 and a printer control unit 1102 and exists as a program file stored in the external memory 209 of the print server 106. In a case where it is executed, the program file is loaded into the RAM 201 and is executed by the CPU 200.

The authentication unit 1101 executes authentication processing. The functions of the authentication unit 1101 are the same as those of the authentication unit 304 of function integrating server 102. The printer control unit 1102 provides a function for controlling an accepted print job. Further, the printer control unit 1102 has a Web service interface and provides functions such as print-job canceling function, print-job status notification function and print-job execution function.

The key chain management unit 305 of function integrating server 102 has a key chain forward-lookup function for retrieving user name 504 using the external access key 505 as a key and acquiring different authentication domain user name 506.

Figure 6B:
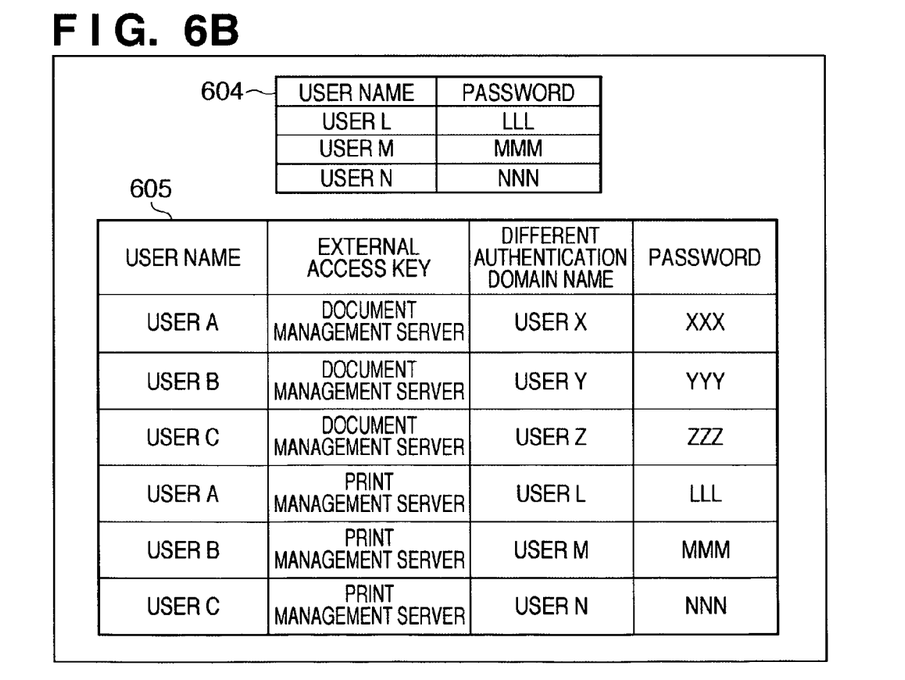
FIG. 6B is a diagram illustrating data managed by an authentication unit and key chain management unit according to a second embodiment of the present invention.

Processing for introducing a document of document management server 104 to the print server 106 as a print job will be described with reference to FIGS. 10A to 11B. Data 604 shown in FIG. 6B is data managed by the authentication unit 1101 of print server 106. In this example, "LLL", "MMM" and "NNN" have been registered in the print server 106 as the passwords of user L, user M and user N, respectively.

Data 605 is data managed by the key chain management unit 305. The credentials of the print server 106 have been registered in the data 605, in addition to the data described in the first embodiment, using "user A" of user name as the key. In other words, "user A" of authentication domain A 103 and "user L" of authentication domain C 107 have been associated by the key chain management unit 305. Further, the credentials of the print server 106 have been registered using "user B" of the user name as the key. In other words, "user B" of authentication domain A 103 and "user M" of authentication domain C 107 have been associated by the key chain management unit 305. Further, the credentials of the print server 106 have been registered using "user C" of the user name as the key. In other words, "user C" of authentication domain A 103 and "user N" of authentication domain C 107 have been associated by the key chain management unit 305 of function integrating server 102.

Figure 10A:
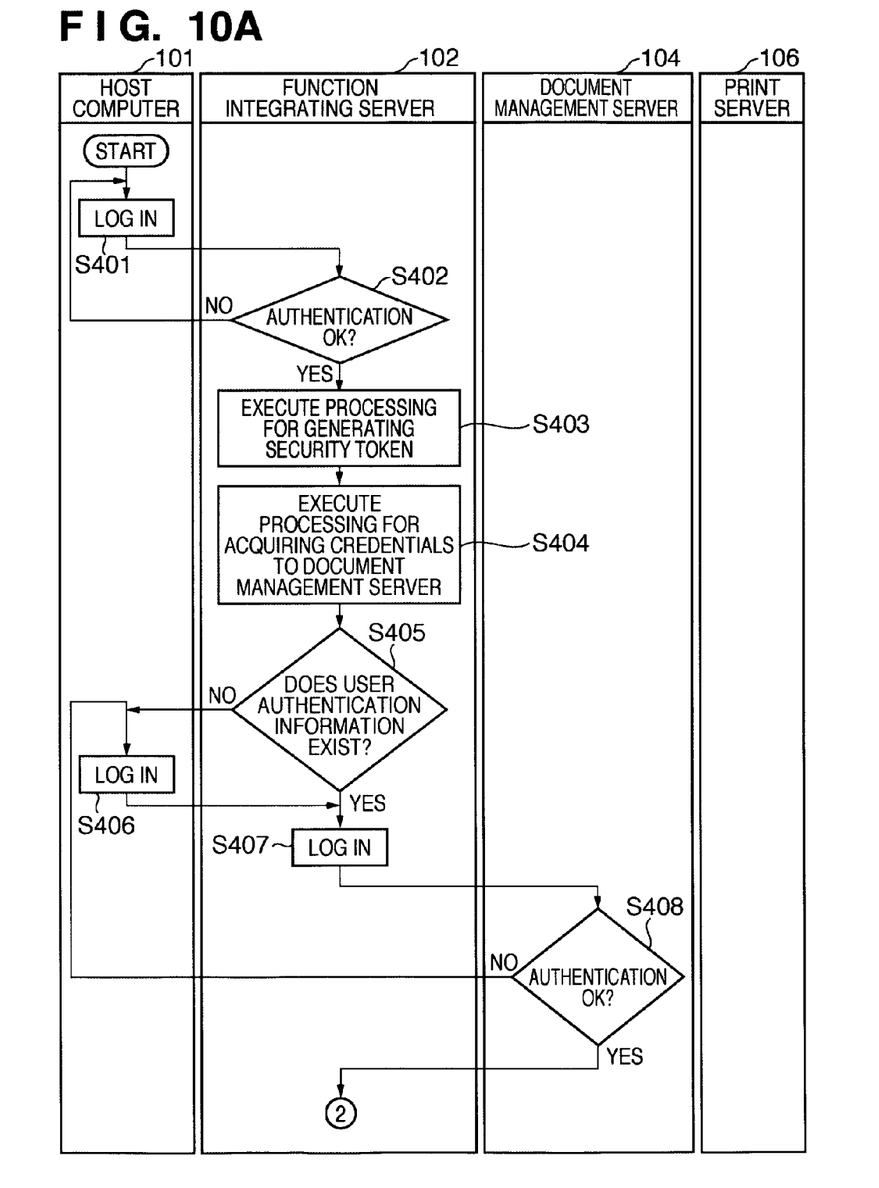
FIGS. 10A and 10B are flowcharts illustrating processing for introducing a print job to a print server.
Figure 10B:
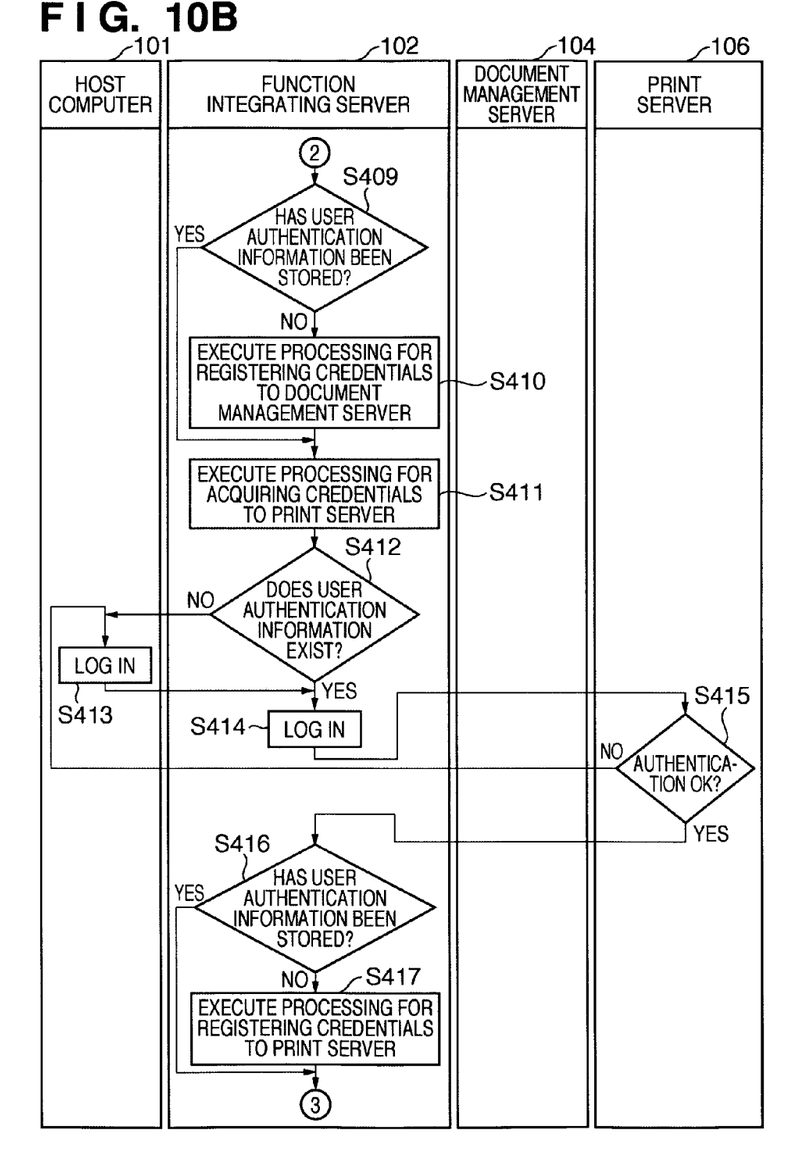

The processing from step S401 to step S410 shown in FIGS. 10A and 10B is identical with the processing of step S101 to step S110 shown in FIG. 7 of the first embodiment. Further, the processing from step S411 to step S417 is the same as that of step S404 to step S410 except for the fact that the destination of authentication is the print server 106 and not the document management server 104. Control proceeds from step S417 to step S500.

Figure 11A:
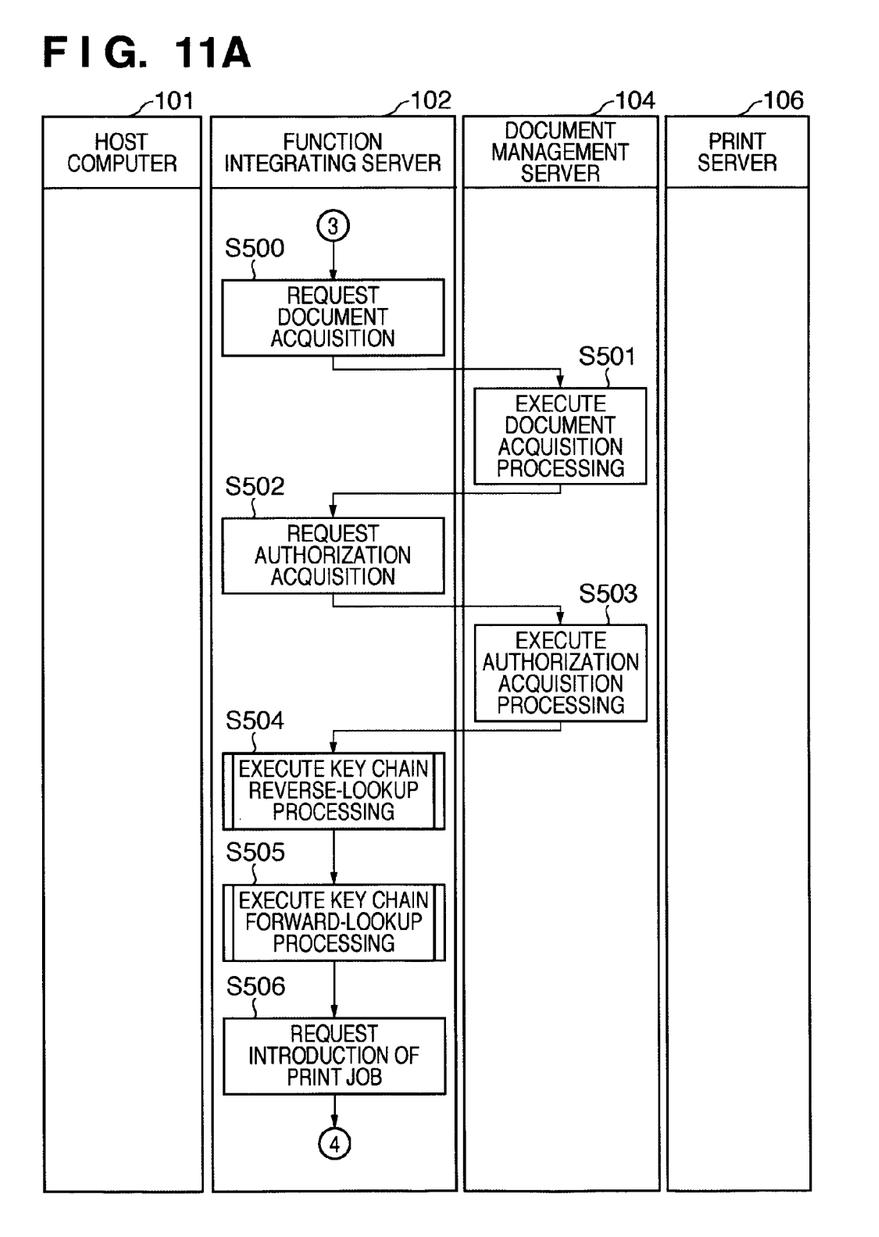
FIGS. 11A and 11B are flowcharts illustrating processing for introducing a print job to a print server.

In step S500 in FIG. 11A, the application server 302 of function integrating server 102 issues a document acquisition request to the document management server 104. In step S501, the document management unit 307 of document management server 104 responds to the document acquisition request from the function integrating server 102 by acquiring the designated document itself from a database it is managing and sending the document back to the function integrating server 102.

Next, in step S502, the application server 302 of the function integrating server 102 issues the document management server 104 an acquisition request for authorization information of the acquired document. In step S503, the document management unit 307 of the document management server 104 responds to the request for acquisition of the document authorization information from the function integrating server 102 by acquiring the authorization information of the designated document from the database it is managing and sending this information back to the function integrating server 102. Assume that the users X, Y and Z each possess a write authorization as the document authorization.

In step S504, the application server 302 of function integrating server 102 applies key chain reverse-lookup processing to the document authorization information accepted by the key chain management unit 305. As a result of this processing, a data conversion is made in the following manner: "user Y"→"user B", "user Z"→"user C".

Next, in step S505, the application server 302 of function integrating server 102 applies key chain forward-lookup processing to the document authorization information converted in step S504 by the key chain management unit 305 and converts the user name in authentication domain A 103 to the user name in authentication domain C 107. As a result of this processing, a data conversion is made in the following manner: "user B"→"user M", "user C"→"user N".

Figure 11B:
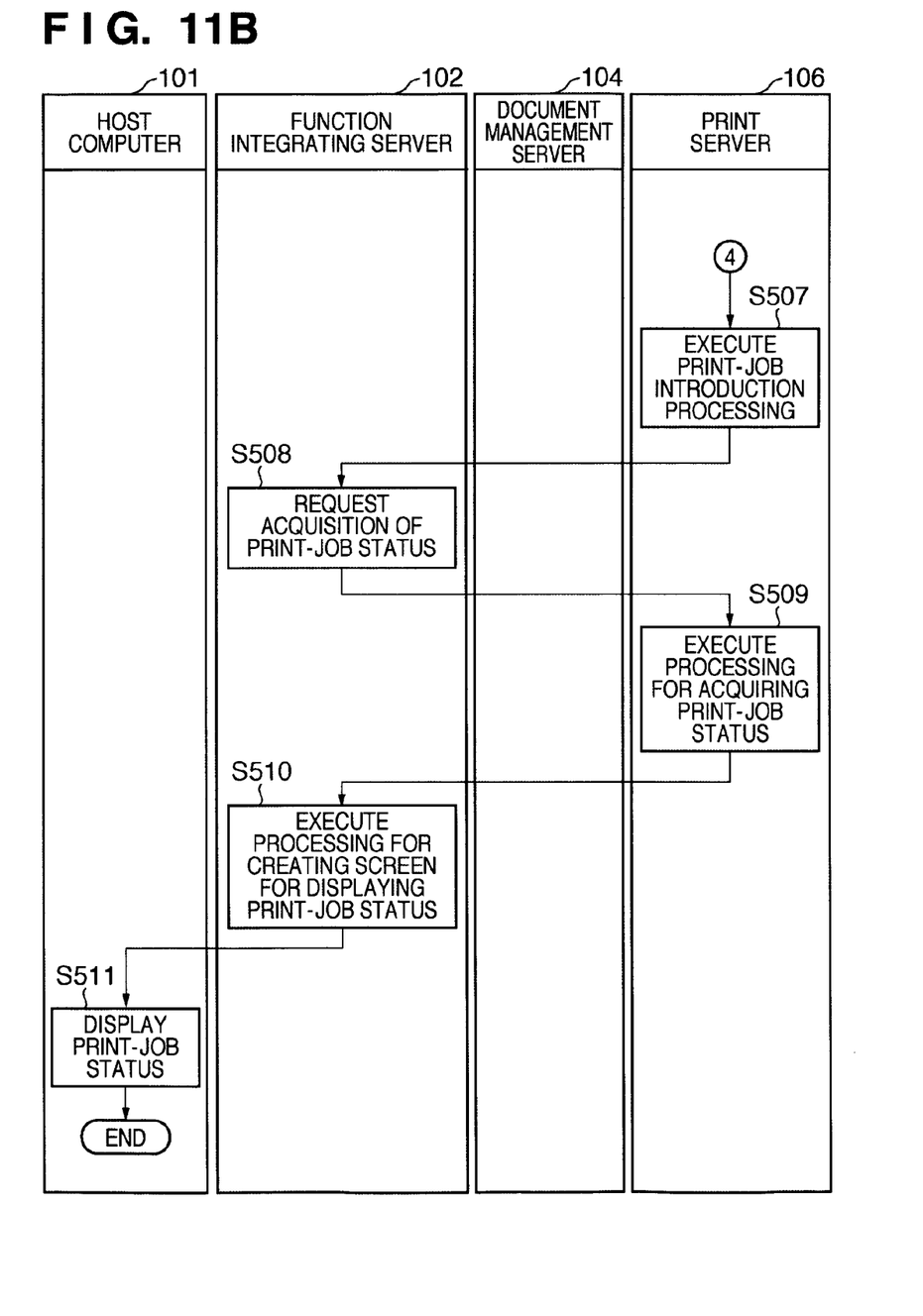

Next, in step S506, the application server 302 requests the print server 106 for introduction of the received document as a print job using the authorization information obtained by the conversion in step S505. In step S507, the printer control unit 1102 of the print server 106 responds to the print-job introduction request from the function integrating server 102 by executing print-job introduction processing and sending the result back to the function integrating server 102.

Next, in step S508, the application server 302 of the function integrating server 102 issues a request for acquisition of the status of the print job that has been introduced. In step S509, the printer control unit 1102 of print server 106 responds to the print-job status acquisition request from the function integrating server 102 by executing processing for acquiring the status of the print job and sending the result back to the function integrating server 102.

Next, in step S510, the function integrating server 102 creates a screen for displaying the status of the print job and sends the result back to the host computer 101. Then, in step S511, the browser 300 of host computer 101 displays the screen received from the function integrating server 102.

Thus, as described above, authentication can be performed and data acquired seamlessly between different authentication domains. Furthermore, by converting user-related information between different authentication domains appropriately, continuity can be maintained with regard to exchanges of data between different authentication domains.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-181969, filed Aug. 4, 2009, which is hereby incorporated by reference herein in its entirety.

The invention claimed is:

1. An information processing apparatus configured to communicate with a document management server belonging to a first authentication domain and a print server belonging to a second authentication domain, comprising:

a first registration unit configured to, in a case where authentication processing by the document management server succeeds using a first authentication domain user name after authentication processing to the information processing apparatus has succeeded using an information processing apparatus domain user name, register the first authentication domain user name in association with the information processing apparatus domain user name;

a second registration unit configured to, in a case where authentication processing by the print server succeeds using a second authentication domain user name after the authentication processing to the information processing apparatus has succeeded using the information processing apparatus domain user name, register the second authentication domain user name in association with the information processing apparatus domain user name;

an acquisition unit configured to acquire a document managed by the document management server and document authorization information including the first authentication domain user name; and a conversion unit configured to convert the first authentication domain user name included in the acquired document authorization information into the registered information processing apparatus domain user name associated with the first authentication domain user name, and then convert the converted information processing apparatus domain user name into the registered second authentication domain user name associated with the converted information processing apparatus domain user name, wherein the acquired document and the document authorization information including the converted second authentication domain user name are sent to the print server as a print job.

2. The apparatus according to claim 1, wherein the conversion unit does not perform conversions in a case where there is no first authentication domain user name registered in association with the information processing apparatus domain user name.

3. The apparatus according to claim 1, wherein in a case where there are one or more first authentication domain user names that have been registered in association with the information processing apparatus domain user name, the conversion unit refers to a registration history, converts a first authentication domain user name that has been registered last into the registered information processing apparatus domain user name and converts the converted information processing apparatus domain user name into the registered second authentication domain user name associated with the converted information processing apparatus domain user name.

4. The apparatus according to claim 1, further comprising a unit configured to manage authorization information with respect to the authentication information;

wherein the conversion unit performs conversions based upon the authorization information.

5. A method of processing executed by an information processing apparatus configured to communicate with a document management server belonging to a first authentication domain and a print server belonging to a second authentication domain, the method comprising controlling the information processing apparatus to execute steps comprising:

in a case where authentication processing by the document management server succeeds using a first authentication domain user name after authentication processing to the information processing apparatus has succeeded using an information processing apparatus domain user name, registering the first authentication domain user name in association with the information processing apparatus domain user name;

in a case where authentication processing by the print server succeeds using a second authentication domain user name after the authentication processing to the information processing apparatus has succeeded using the information processing apparatus domain user name, registering the second authentication domain user name in association with the information processing apparatus domain user name;

acquiring a document managed by the document management server and document authorization information including the first authentication domain user name; and converting the first authentication domain user name included in the acquired document authorization information into the registered information processing apparatus domain user name associated with the first authentication domain user name to convert the converted information processing apparatus domain user name into the registered second authentication domain user name associated with the converted information processing apparatus domain user name, wherein the acquired document and the document authorization information including the converted second authentication domain user name are sent to the print server as a print job.

6. A non-transitory computer-readable recording medium retrievably recording a computer-executable program for causing a computer to execute the method of processing executed by the information processing apparatus set forth in claim 5.

* * * * *